(12) United States Patent
Ferron

(10) Patent No.: US 7,487,882 B2
(45) Date of Patent: Feb. 10, 2009

(54) FOOD COOKING VESSEL WITH TEMPERATURE INDICATING MEANS

(75) Inventor: Francesco Ferron, Casalmaggiore (IT)

(73) Assignee: Ballarini Paolo & Figli, S.p.A., Montovano (IT)

( * ) Notice: Subject to any disclaimer, the term of this patent is extended or adjusted under 35 U.S.C. 154(b) by 513 days.

(21) Appl. No.: 10/884,061

(22) Filed: Jul. 1, 2004

(65) Prior Publication Data

US 2005/0103209 A1 May 19, 2005

(30) Foreign Application Priority Data

Nov. 14, 2003 (IT) .......................... MI2003A2201

(51) Int. Cl.
*A47J 27/00* (2006.01)
*A47J 36/00* (2006.01)

(52) U.S. Cl. ...................... 220/573.1; 220/756; 99/342

(58) Field of Classification Search .............. 220/573.1, 220/755, 756; 16/425; 99/342
See application file for complete search history.

(56) References Cited

U.S. PATENT DOCUMENTS

| | | | | |
|---|---|---|---|---|
| 2,521,463 | A | * | 9/1950 | Kircher ....................... 220/752 |
| 3,405,678 | A | * | 10/1968 | Frenkel et al. .............. 374/141 |
| 4,680,829 | A | * | 7/1987 | Baumgarten ................ 220/759 |
| 6,848,355 | B2 | * | 2/2005 | Cesare ........................ 99/342 |

FOREIGN PATENT DOCUMENTS

WO        WO 0351165 A1 *  6/2003

* cited by examiner

*Primary Examiner*—Anthony D Stashick
*Assistant Examiner*—Harry A Grosso
(74) *Attorney, Agent, or Firm*—Kirschstein et al.

(57) ABSTRACT

In a food cooking vessel, components of the vessel arranged outside it are coated by a coating containing thermochromatic pigments.

7 Claims, 1 Drawing Sheet

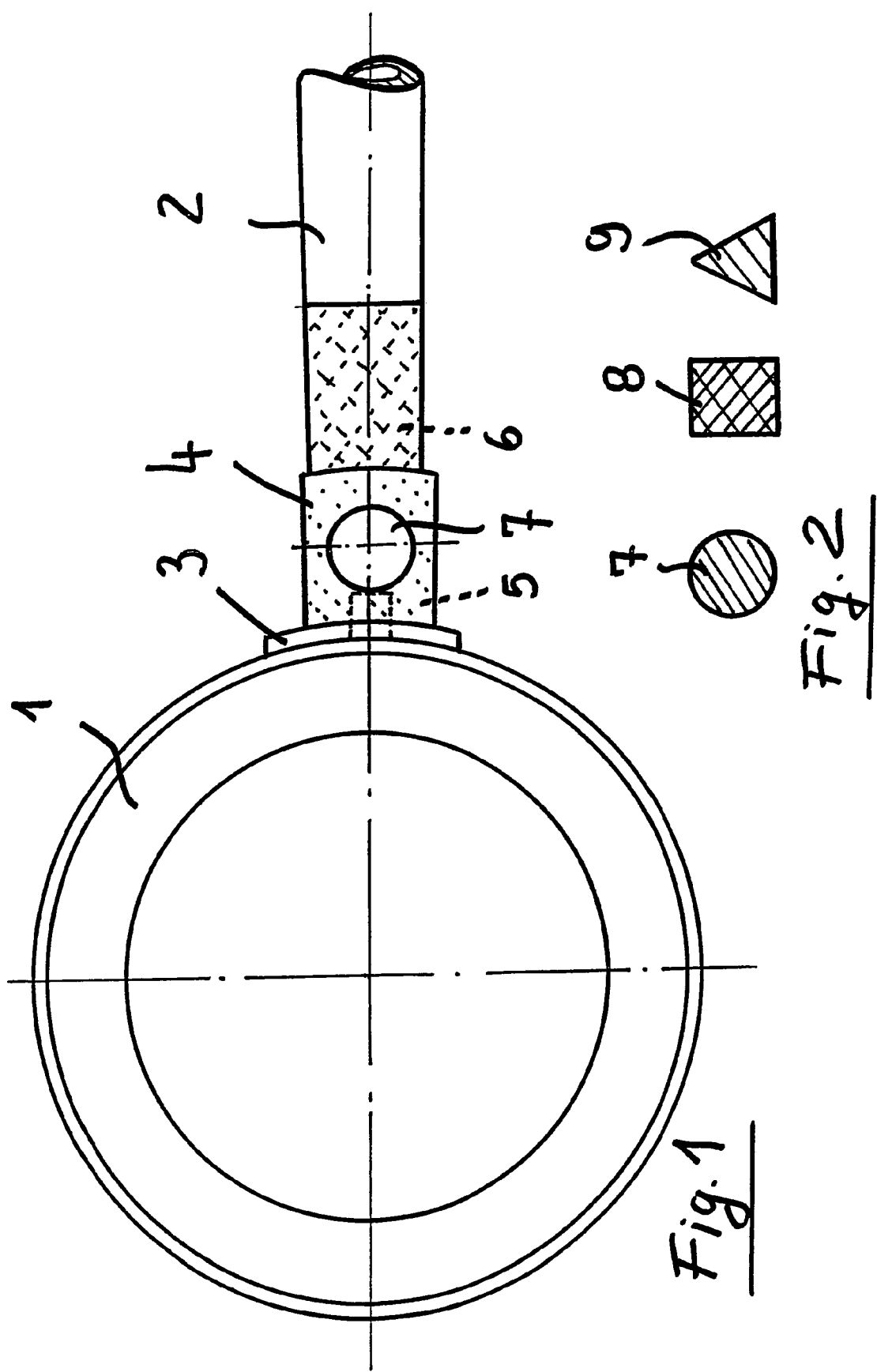

FOOD COOKING VESSEL WITH TEMPERATURE INDICATING MEANS

BACKGROUND OF THE INVENTION

The present invention relates to a food cooking vessel with temperature indicating means.

In using pots, it would be useful, both during and after the cooking step, to indicate that the pot has achieved a set temperature, and that the portions thereof are hot thereby allowing the user to take precautions against burns.

Pots or frying pans having at a central position of their bottom, a thermochromatic pigment containing coating indicating, by a color change, that the bottom has achieved a set temperature, are already commercially known.

However, this prior solution has the drawback that it indicates only and exclusively the temperature corresponding to the central region of the pot bottom, but not that of pot outer regions.

Moreover, with the food arranged in the pot, this chromatic indication cannot be seen, since the food being cooked covers the thermochromatic pigment coating.

Another prior art approach provides to use a thermosensitive liquid crystal device, the liquid crystals of which are embedded in the pot handle, which handle is for example made of a plastic material and projects from the pot body or vessel.

This prior thermosensitive liquid crystal device provides a temperature indication, which, even in this case, is measured at the inner regions of the vessel. Such prior device, however, is very complex and expensive and, moreover, is susceptible to be easily degraded in operation, because of the high temperature of the cooking regions or the moisture and heat present inside a dishwasher.

SUMMARY OF THE INVENTION

Accordingly, the aim of the present invention is to overcome the above mentioned drawbacks of the prior art and provide a food cooking vessel including an improved means for signaling the achieved temperature, said means being adapted to be arranged outside the vessel and applied, by unexpensive methods, on outer portions thereof.

This aim is achieved by a food cooking vessel, characterized in that said food cooking vessel comprises constructional components, arranged outside said cooking vessel, said constructional components being coated by a coating layer containing thermochromatic pigments.

BRIEF DESCRIPTION OF THE DRAWINGS

Further characteristics of the invention will become more apparent hereinafter from the following disclosure and the sub-claims.

The present invention will be disclosed and illustrated hereinafter in a more detailed manner, with respect to an exemplary embodiment thereof, shown in the accompanying drawing, where:

FIG. 1 schematically shows a top plan view of a cooking pot having a handle and outer coatings according to the invention;

FIG. 2 schematically shows a series of indication labels to be applied on the outside of the pot.

DESCRIPTION OF THE PREFERRED EMBODIMENTS

FIG. 1 shows a top plan view of a cooking pot 1 having a handle 2.

Advantageously, the inside of the pot 1 is coated by an antiadhering coating.

A fire or flame stop device 4 is coupled to the body of the pot 1 by a fire stop plate 3, of a per se known type. Both the fire stop plate 3 and the fire stop device 4 body are made of a metal material.

In this connection it should be apparent that it would also be possible to use other clamping systems, for example a screw stud, welded to the pot body, the handle being clamped by a clamping screw.

A tubular body projects from the fire or flame stop device 4, said tubular body receiving a handle 2 made of a metal or wood material, or also of a synthetic material.

It should be also pointed out that the term "pot" would also obviously comprise other cooking containers or vessels, such as, for example, fraying pans, stewpans and like containers or vessels.

The outer constructional parts of the vessel 1 are provided with coating layers containing thermochromatic pigments having a variable thermal sensitivity.

Such a coating will further comprise pigments which, depending on the achieved temperature, will change their colors, for example from a starting black color (as the vessel 1 is at environment temperature) to a red or red-orange color, as the vessel is heated for example to the cooking temperature, which can vary from 150° C. to 240° C.

Thermochromatic pigment containing coatings are known in the prior art, and are made, for example, by the firm Keystone.

FIG. 1 shows different manners for detecting and indicating the temperature of the inside of the vessel 1.

Thus, for example, the body of the fire stop tubular device 4 can be coated, before assembling it by the plate 3, by a thermochromatic pigment holding coating layer 5.

It would be also possible to arrange the thermochromatic pigment holding coating at any other technically suitable places.

A further possibility would be to provide the handle 2 with a thermochromatic pigment holding coating 6 and, finally, it would be also possible to apply, by glueing it on the fire stop body 4, or on the handle 2, a label 7 coated by a thermochromatic pigment holding layer.

Such a label 7 would provide the advantage that, after a given period of use of the vessel 1, and upon deteriorating the thermochromatic pigment, the label 7 could be removed and replaced by a new one.

Moreover, said labels provide the advantage that they can be series made at a low cost and can be quickly and easily applied.

Moreover, said thermochromatic pigment holding labels can have different patterns, for a better disposal of thereof. As shown in FIG. 2, the label 7 has a circular configuration, whereas a label 8 can have a square configuration and a label 9, for example, a triangular configuration.

The different configurations of said labels 7, 8 and 9 allow moreover to make and facilitate the use of different thermal sensitivity labels. Thus, for example, a label could comprise thermochromatic pigments changing their colors at temperatures of about 80-100° C.

A further label can have a coating changing its color at a temperature of about 150° C. and yet another label could hold therein a thermochromatic pigmentation changing its color starting from 180° C. to 240° C., and this only to provide some examples.

The great advantage provided by the present invention should be envisaged in the fact that the thermal indicating means are arranged inside the vessel. The indicating coating can be applied on different outer components of the vessel, for example on the projecting fire stop body, on the fire stop body mounting plate or directly on the handle, fitted in the tubular body of the fire stop body or device.

It would also be possible to apply to adjoining regions said thermochromatic pigment holding coatings, which would be sensitive to different temperatures.

In a particularly advantageous manner, the thermal indicating or signaling coating is applied by a spraying type of applying method.

It would be furthermore advantageous to apply said thermochromatic pigment holding coating by a screen printing method.

Moreover, it has been found as advantageous to apply the thermal signaling or indicating pigment holding layer by a buffering system and, finally, it would be also advantageous and possible to apply the thermochromatic pigment holding coating layer by using transfer printing methods.

The invention claimed is:

1. A food cooking vessel, comprising:
   a main body;
   a fire stop device exteriorly coupled to, and in thermal contact with, the main body, and extending radially of the main body along an axis;
   a handle exteriorly coupled to the fire stop device and extending along the axis; and
   a plurality of labels having different shapes and being coated with thermochromatic pigments of different thermal sensitivities, each of the shapes being associated with a different thermal sensitivity at which the respective pigment changes color, a selected one of the labels being mounted on one of the fire stop device and the handle.

2. The vessel of claim 1, wherein the selected one of the labels is removably mounted on the one of the fire stop device and the handle.

3. The vessel of claim 1, wherein the pigments are spray-coated on the labels.

4. The vessel of claim 1, wherein the pigments are screen-printed on the labels.

5. The vessel of claim 1, wherein the pigments are buffered on the labels.

6. The vessel of claim 1, wherein the shapes are circular, square and triangular.

7. The vessel of claim 1, wherein one of the pigments changes color at 80-100° Centigrade, wherein another of the pigments changes color at 150° Centigrade, and wherein still another of the pigments changes color at 180-240° Centigrade.

* * * * *